US011040607B2

(12) United States Patent
McGrew, Jr. et al.

(10) Patent No.: US 11,040,607 B2
(45) Date of Patent: Jun. 22, 2021

(54) MULTIPLE MOTOR MULTIPLE SPEED CONTINUOUS POWER TRANSMISSION

(71) Applicant: Allison Transmission, Inc., Indianapolis, IN (US)

(72) Inventors: Arthur L. McGrew, Jr., Indianapolis, IN (US); Isaac Mock, Martinsville, IN (US); George S. Pelton, Indianapolis, IN (US); James Allen Raszkowski, Indianapolis, IN (US); John Andrew Byerly, Carmel, IN (US); John L. Saler, Westfield, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 6 days.

(21) Appl. No.: 16/510,004

(22) Filed: Jul. 12, 2019

(65) Prior Publication Data
US 2021/0008968 A1   Jan. 14, 2021

(51) Int. Cl.
*B60K 6/48* (2007.10)
*B60K 6/365* (2007.10)
*B60K 6/383* (2007.10)
*F16H 3/72* (2006.01)
(Continued)

(52) U.S. Cl.
CPC ............ *B60K 1/02* (2013.01); *B60K 6/48* (2013.01); *B60L 5/12* (2013.01); *B60K 2006/4808* (2013.01); *B60L 2220/42* (2013.01)

(58) Field of Classification Search
CPC .... B60K 1/02; B60K 6/48; B60K 2006/4808; B60K 6/365; B60K 6/383; B60L 5/12; B60L 2220/42; F16H 3/728; F16H 3/727
See application file for complete search history.

(56) References Cited

U.S. PATENT DOCUMENTS

| 5,931,757 A * | 8/1999 | Schmidt ............ B60K 6/40 475/2 |
| 6,793,600 B2 | 9/2004 | Hiraiwa |
| 7,935,015 B2 | 5/2011 | Tabata et al. |

(Continued)

FOREIGN PATENT DOCUMENTS

| DE | 10235257 A1 | 2/2003 |
| EP | 2449286 B1 | 3/2013 |
| WO | 2018224742 A1 | 12/2018 |

OTHER PUBLICATIONS

PCT, Intl. App. No. PCT/US2020/070254, International Search Report, 4 pages, dated Oct. 30, 2020.
(Continued)

*Primary Examiner* — Tisha D Lewis
(74) *Attorney, Agent, or Firm* — Woodard, Emhardt, Henry, Reeves & Wagner, LLP

(57) ABSTRACT

An electric powertrain includes a first electric motor that has an uninterrupted connection with a drive shaft of a vehicle. The electric powertrain further includes a second electric motor that has an interruptible connection with the drive shaft. In one form, this interruptible connection includes a clutch. The electric powertrain further includes a first gear train in the form of a first planetary gear and a second gear train in the form of a second planetary gear. To provide a compact configuration, the first electric motor and second electric motor are arranged in a centerline orientation with the drive shaft.

25 Claims, 12 Drawing Sheets

(51) Int. Cl.
*B60K 1/02* (2006.01)
*B60L 5/12* (2006.01)

(56) References Cited

U.S. PATENT DOCUMENTS

| | | |
|---|---|---|
| 8,196,687 B2 | 6/2012 | Swales et al. |
| 9,120,480 B2 | 9/2015 | Kiuchi |
| 9,566,852 B2 | 2/2017 | Knoblauch et al. |
| 10,144,309 B2 | 12/2018 | Leng et al. |
| 10,183,570 B2 | 1/2019 | Kimes et al. |
| 2007/0093341 A1* | 4/2007 | Supina ............... B60K 6/46 475/5 |
| 2009/0029824 A1 | 1/2009 | Tabata et al. |
| 2009/0084653 A1 | 4/2009 | Holmes |
| 2010/0048338 A1* | 2/2010 | Si ..................... B60W 20/15 475/5 |
| 2011/0251747 A1 | 10/2011 | Imai et al. |
| 2013/0095970 A1 | 4/2013 | Conlon et al. |
| 2015/0229162 A1 | 8/2015 | Gottfried |
| 2016/0047439 A1* | 2/2016 | Kimes ................ B60K 6/387 475/5 |
| 2016/0325730 A1* | 11/2016 | Ono .................... B60K 6/50 |
| 2017/0182995 A1 | 6/2017 | Endo et al. |
| 2018/0290534 A1* | 10/2018 | Pan .................. B60K 17/344 |
| 2019/0077259 A1* | 3/2019 | Singh ............... B60W 30/1888 |
| 2019/0078666 A1* | 3/2019 | Duhaime ......... B60W 30/1888 |

OTHER PUBLICATIONS

PCT, Intl. App. No. PCT/US2020/070254, Written Opinion of the International Searching Authority, 8 pages, dated Oct. 30, 2020.

\* cited by examiner

MULTIPLE MOTOR MULTIPLE SPEED CONTINUOUS POWER TRANSMISSION

BACKGROUND

With environmental and other concerns, there has been a recent trend to convert vehicles powered by fossil fuels to other forms of energy such as electricity. Significant developments of electric motor technology have occurred mainly in the consumer passenger car field. However, commercial heavy duty vehicles have been slower to transition from fossil fuels to electricity due to a number of factors including the high torque requirements for such vehicles and vehicle range concerns. The greater torques required to drive such commercial vehicles require larger and heavier electric motors which can tend to increase energy consumption. Retrofitting these electric powertrains to preexisting vehicle designs can also be challenging.

Thus, there is a need for improvement in this field.

SUMMARY

A system includes two or more electric motors that provide power to an output such as a drive shaft of a vehicle. One of the electric motors ("A"), which is referred to as the "first motor", is always connected to the output drive shaft in order to continuously provide power for propelling the vehicle. In other words, the first electric motor (A) has an uninterrupted connection with the output. In some cases, the first electric motor (A) is connected to the output via a planetary gear arrangement so as to reduce speed and increase output torque.

The system further includes a second electric motor ("B") that intermittently applies torque to the output shaft. In one variation, this intermittent connection between the second electric motor (B) and the output includes at least one clutch. The clutch engages and disengages the second electric motor (B) with the output shaft. With this arrangement, the second electric motor (B) is able to provide additional torque or power to supplement the first (A) electric motor on an as-needed basis. Among other things, this multiple electric motor system allows smaller electric motors to be used which can be less expensive than a comparably-powered larger electric motor. For instance, this system allows small automobile electric motors to be used to drive large 40,000 pound or more vehicles.

One particular example is directed to a two-motor version that incorporates a dog clutch. In this example, both the first (A) and second (B) motors are high-speed motors (e.g., having 10,600 rpm). The dog clutch along with gearing is used to transmit torque from the second electric motor (B) to the output shaft which is constantly powered by the first electric motor (A) through gearing as well. In other examples, other types of clutch arrangements can be used. For example, a single actuator can be used in conjunction with a selectable one-way clutch (SOWC). Different combinations of high and low speed motors can be used along with various arrangements of motors, gearing, clutches, and drive pathways.

Aspect 1 generally concerns a system that includes a first electric motor with an uninterrupted connection to an output and a second electric motor with an interruptible connection to the output.

Aspect 2 generally concerns the system of any previous aspect in which the uninterrupted connection of the first electric motor includes a first gear train configured to reduce speed.

Aspect 3 generally concerns the system of any previous aspect in which the interruptible connection of the second electric motor includes a second gear train.

Aspect 4 generally concerns the system of any previous aspect in which the first gear train includes a planetary gear.

Aspect 5 generally concerns the system of any previous aspect in which the second electric motor is connected to the output via a clutch.

Aspect 6 generally concerns the system of any previous aspect in which the clutch includes a dog clutch.

Aspect 7 generally concerns the system of any previous aspect in which the clutch includes a wet disc clutch.

Aspect 8 generally concerns the system of any previous aspect in which the clutch has an actuator and a Selectable One-Way Clutch (SOWC).

Aspect 9 generally concerns the system of any previous aspect in which the clutch includes a dry disc clutch.

Aspect 10 generally concerns the system of any previous aspect in which the interruptible connection includes a clutch and a single planetary gear.

Aspect 11 generally concerns the system of any previous aspect in which the first and second electric motors are low speed motors with a maximum speed of less than 5,000 rpm.

Aspect 12 generally concerns the system of any previous aspect in which the second electric motor is configured to supply power to the output via at least two planetary gears and a clutch.

Aspect 13 generally concerns the system of any previous aspect in which the first and second electric motors are high speed motors with a maximum speed of at least 5,000 rpm.

Aspect 14 generally concerns the system of any previous aspect in which the output is configured to move a 40,000 pound or more vehicle.

Aspect 15 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
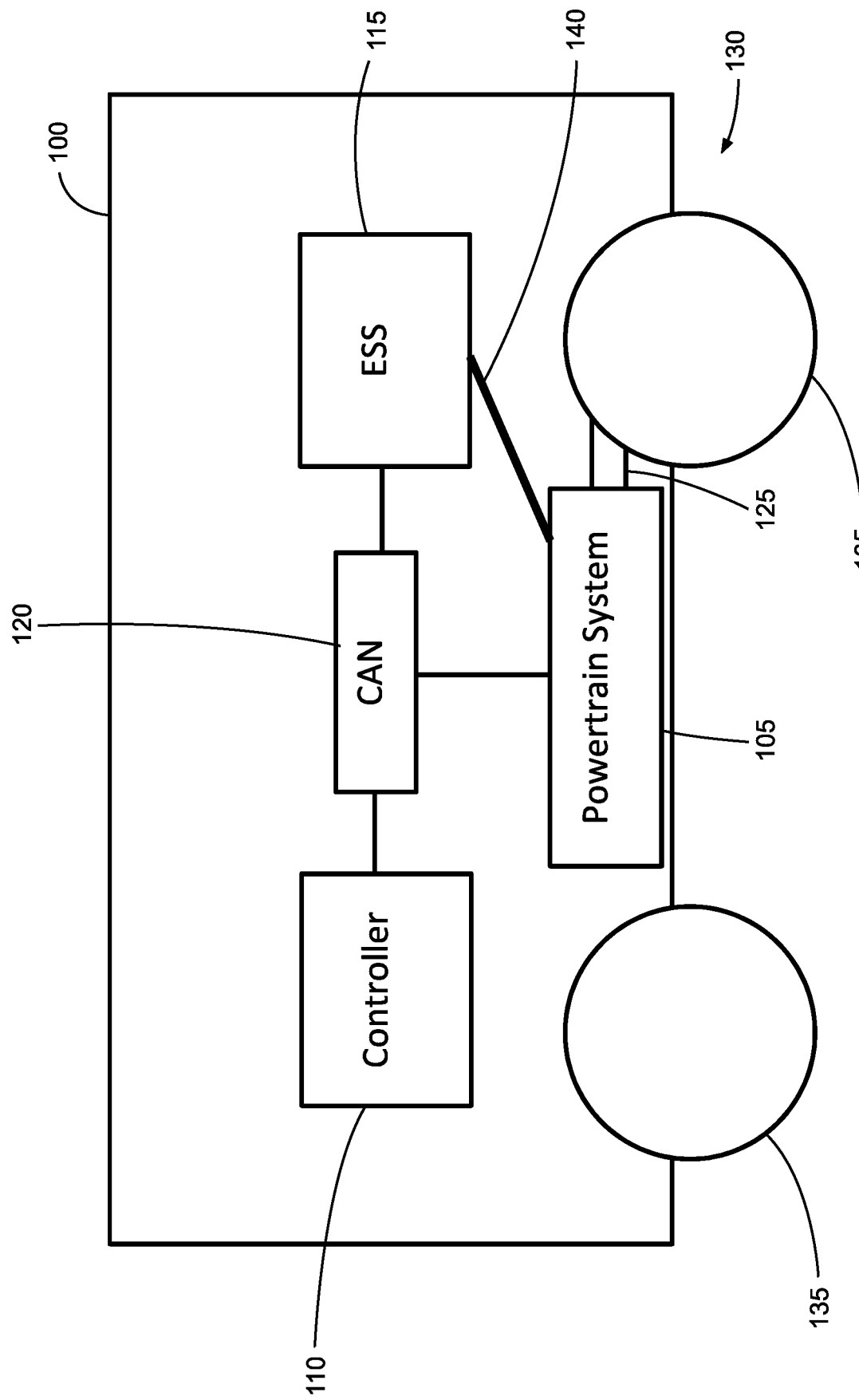
FIG. 1 is a diagrammatic view of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A vehicle 100 according to one example is illustrated in FIG. 1. As shown, the vehicle 100 includes at least one powertrain system 105, at least one controller 110, and at least one Energy Storage System ("ESS") 115 configured to supply power to the powertrain system 105. The powertrain system 105, controller 110, and ESS 115 are operatively connected together so as to communicate with one another via at least one Controller Area Network ("CAN") 120. The controller 110 is configured to control the operation of one or more systems and/or other components of the vehicle 100 such as the powertrain system 105 and ESS 115. The powertrain system 105 has an output or drive shaft 125 that transfers mechanical power from the powertrain system 105 to a propulsion system 130. In the illustrated example, the propulsion system 130 includes one or more wheels 135, but the propulsion system 130 in further examples can include other types of propulsion devices like continuous track systems. One or more power cables 140 transfer electrical power between the powertrain system 105 and the ESS 115.

The powertrain system 105 is designed to electrically propel the vehicle 100 in an efficient manner. As will be explained in greater detail below, the powertrain system 105 is designed to power heavy-duty commercial and/or military grade vehicles such as buses, garbage trucks, delivery trucks, fire trucks, and semi-trailers. The powertrain system 105 is designed to electrically power vehicles 100 with a class group rating of at least four (4) according to the US Department of Transportation Federal Highway Administration (FHWA) classification rule set. In one form, the powertrain system 105 is configured to move at least 40,000 pound (18,144 Kg) passenger vehicles like buses. The powertrain system 105 has a unique, compact centerline design that allows the powertrain system 105 to be easily retrofitted into pre-existing vehicle chassis designs and/or conventional drivetrains with minimal changes to the other parts of the vehicle 100 like the braking and suspension systems. This in turn allows existing internal combustion type vehicles to be readily reconfigured as fully electric vehicles. Moreover, the centerline design of the powertrain system 105 reduces gear loss and other power losses so as to make the vehicle 100 more power efficient which in turn can improve driving range and/or reduce weight of other components such as the ESS 115.

Figure 2:
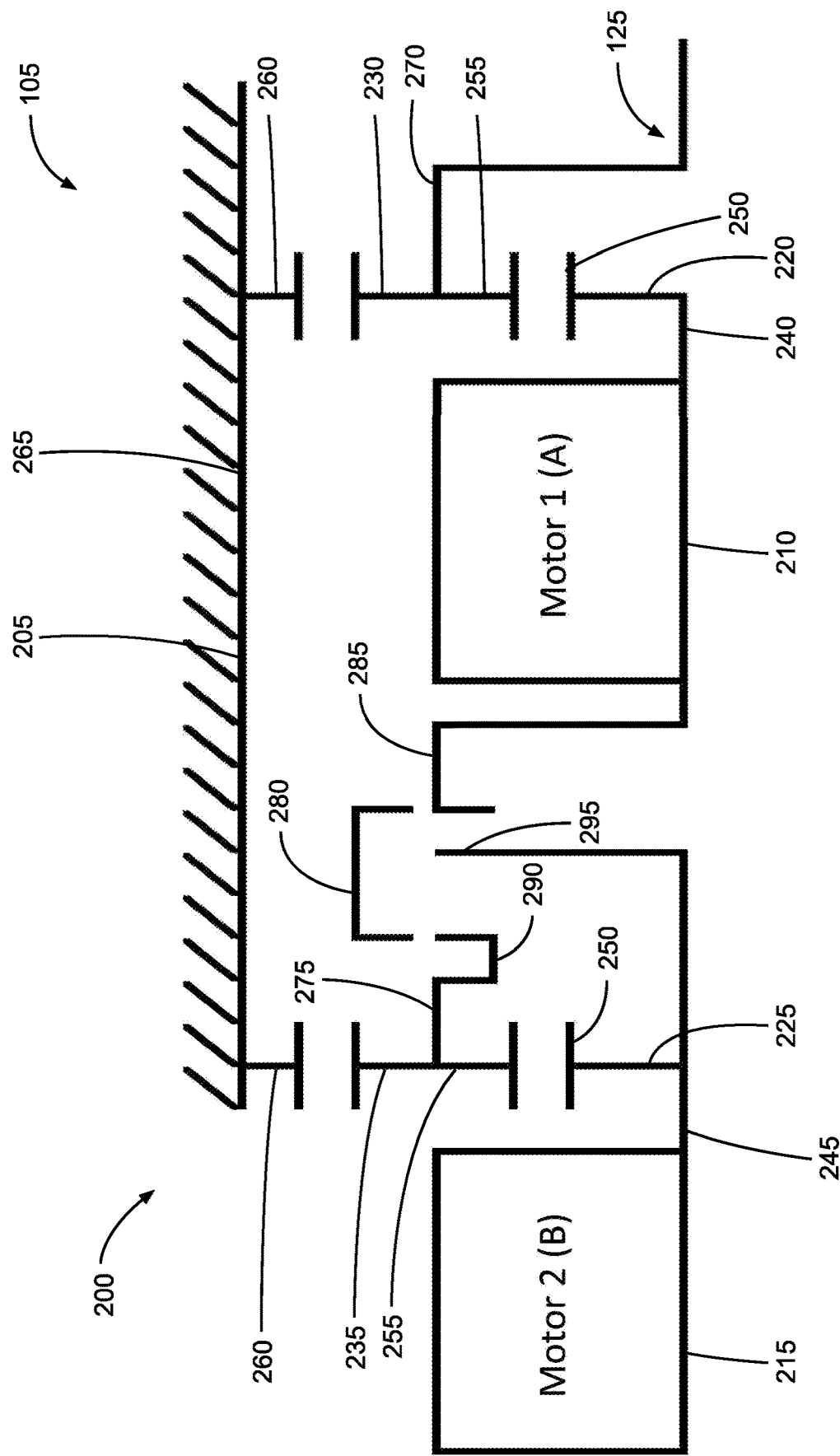
FIG. 2 is a diagrammatic view of one example of an electric powertrain that can be used in the vehicle of FIG. 1.

FIG. 2 shows a diagram of one example of an electric powertrain 200 that can be used in the powertrain system 105 of FIG. 1. As depicted, the electric powertrain 200 includes a multiple motor continuous power transmission 205. The transmission 205 of the electric powertrain 200 includes a first electric motor 210, which is referred to as "Motor A" occasionally, and a second electric motor 215 that is referred to as "Motor B" at times. In one example, the first electric motor 210 and second electric motor 215 are the same type of electric motor such that both motors generally provide the same speed and torque output within normal manufacturing tolerances. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different types (e.g., permanent magnet motors, induction motors, switched reluctance motors, etc.) and/or have different designs/configurations (e.g., pole counts, winding patterns, etc.).

The transmission 205 of the electric powertrain 200 further includes a first gear train 220 located at an output end of the first electric motor 210 and a second gear train 225 located at the output end of the second electric motor 215. As can be seen, the first gear train 220 is located at the output end of the entire transmission 205 that is proximal to the drive shaft 125. The second gear train 225 is sandwiched or located between the first electric motor 210 and the second electric motor 215. This configuration allows the electric powertrain 200 to have a compact design. In the illustrated example, the first gear train 220 is in the form of a first planetary gear 230, and the second gear train 225 is in the form of a second planetary gear 235. The first electric motor 210 and second electric motor 215 respectively have a first output shaft 240 and a second output shaft 245 for providing rotational mechanical power. As illustrated in FIG. 2, the first planetary gear 230 and second planetary gear 235 each has a sun gear 250, one or more planet gears 255 meshed with the sun gear 250, and a ring gear 260 that surrounds and meshes with the planet gears 255. The sun gear 250 of the first planetary gear 230 is secured to the first output shaft 240 of the first electric motor 210, and the sun gear 250 of the second planetary gear 235 is secured to the second output shaft 245 of the second electric motor 215. Both ring gears 260 of the first planetary gear 230 and the second planetary gear 235 are secured to a housing 265 of the electric powertrain 200. The planet gears 255 of the first planetary gear 230 are carried by a first carrier 270. The first carrier 270 is configured to connect with the drive shaft 125 so as to transfer mechanical power from the transmission 205 to the propulsion system 130. The planet gears 255 of the second planetary gear 235 are carried by a second carrier 275.

As shown in FIG. 2, the electric powertrain 200 includes at least one clutch 280 that engages and disengages the second electric motor 215 from the first electric motor 210. Through the clutch 280, the transmission 205 of the electric powertrain 200 is further able to shift gears such that the speed and torque from second electric motor 215 can be changed. The first electric motor 210 is permanently connected to the drive shaft 125 (i.e., there is no clutch) such that the first electric motor 210 is able to provide continuous power to the drive shaft 125 and propulsion system 130. In other words, the first electric motor 210 has an uninterrupted connection to the drive shaft 125, and the second electric motor 215 has an interruptible connection to the drive shaft 125. This configuration of the electric powertrain 200 facilitates power shifting in which power is always able to be provided to the wheels 135 even when shifting of the clutch 280 occurs. With power being continuously provided, any shifting can be made generally imperceptible to the driver and/or passengers. Moreover, acceleration performance of the vehicle 100 is enhanced, and the vehicle 100 is better able to maintain speed at higher grades.

In the illustrated example, the electric powertrain 200 includes a single clutch 280, but the electric powertrain 200 in other examples can include more than one clutch. In one variation, the clutch 280 is a dog clutch (e.g., 3-way dog clutch), and in another, the clutch 280 includes a dog clutch (e.g., 2-way dog clutch) along with a Selectable One-Way Clutch (SOWC). In further variations, the clutch 280 includes a wet disc type clutch or a dry disc type clutch. The first output shaft 240 for the first electric motor 210 has a clutch engagement member 285 where the clutch 280 is able to engage the first output shaft 240. The second carrier 275 of the second planetary gear 235 has a first range member 290 where the clutch 280 engages when in a first range position. When in the first range position, the clutch 280 connects the first range member 290 to the clutch engagement member 285 such that the speed (i.e., rpm) provided by the second electric motor 215 is reduced through the second gear train 225, and the torque provided by the second electric motor 215 to the first output shaft 240 is increased through the planet gears 255 of the second planetary gear 235. The second output shaft 245 of the second electric motor 215 has a second range member 295 where the clutch 280 engages when in a second range position. When in the second range position, the clutch 280 connects the second range member 295 to the clutch engagement member 285 such that the speed and torque of the second electric motor 215 is directly provided to the first output shaft 240 of the first electric motor 210. As compared to the first range position, the speed of the second electric motor 215 provided to the first output shaft 240 of the first electric motor 210 is faster, and the torque is less.

The clutch 280 can further be positioned at a neutral position where the second electric motor 215 is not mechanically coupled to the first electric motor 210. In the neutral or shift position, the first electric motor 210 can provide the sole mechanical power to propel the vehicle 100. Among other things, this ability to propel the vehicle 100 solely via the first electric motor 210 while the second electric motor 215 is disconnected from the first output shaft 240 allows the second electric motor 215 to synchronize speed with the first electric motor 210 in order to engage the clutch 280 (e.g., when the clutch 280 is a dog clutch) without power interruption to the vehicle 100. This also allows the first electric motor 210 to operate at a more efficient point than when sharing the output load with the second electric motor 215.

By using more than one electric motor, the powertrain system 105 is configured to allow smaller, consumer automotive electric motors to be used to power larger, commercial-grade vehicles such as those with a FHWA class rating of four (4) or higher. For instance, consumer automotive electric motors can be used to move vehicles 100 weighing 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Due to high demand and high production volumes, improvements in electric motor technology tends to occur more rapidly in the consumer space such that it is expected that these benefits of consumer automotive electric motors over lower demand commercial-grade electric vehicle motors will become more pronounced in the future. However, there are still drawbacks to using these consumer-grade electric motors for heavy commercial vehicles. Individual consumer-grade electric vehicle motors tend to produce insufficient torque to properly move and/or accelerate heavy duty vehicles such as buses and semi-trucks. There is also a trend to have the consumer-grade electric motors operate at even higher speed or rotations per minute (rpms) which are not desirable for heavy duty commercial-grade vehicles which tend to operate at lower speeds and require higher torques.

To facilitate the use of these consumer electric vehicle motors in heavy duty commercial applications, the powertrain system 105 includes at least two electric motors (.e.g., the first electric motor 210 and second electric motor 215) so as to provide sufficient torque and power to the drive shaft 125 and the propulsion system 130. The powertrain system 105 further includes at least the first gear train 220 so as to reduce the speed and increase the torque provided by the first electric motor 210 and/or second electric motor 215. As shown, the powertrain system 105 can include additional gear trains, such as the second gear train 225, to enhance the performance of the powertrain system 105.

This multiple motor design also can use energy more efficiently. The power, speed, and/or torque provided by the first electric motor 210 and the second electric motor 215 can be adjusted so that the motors operate in a more efficient manner for differing operational conditions. For example, the clutch 280 can change the gear ratios of the second gear train 225 so as to adjust the output speed and/or torque provided by the second electric motor 215. The clutch 280 can further be used to disconnect the second electric motor 215 from the first electric motor 210 such that the first electric motor 210 provides all of the propulsive mechanical power to the drive shaft 125. At the same time, the second electric motor 215 can be shutdown to conserve power and allow the first electric motor 210 to operate within an efficient power band, or the speed of the second electric motor 215 can be changed for shifting purposes. Once more, with the first electric motor 210 permanently connected to the drive shaft 125, power can be always applied to the propulsion system 130 such that any shifting of the second gear train 225 via the clutch 280 can be imperceptible to the driver and/or passengers of the vehicle 100. Given the first electric motor 210 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 210, second electric motor 215, second gear train 225, and/or clutch 280. By providing additional time for shifting without interrupting power, better synchronization can occur before clutch engagement which in turn prolongs the life of the clutch 280.

This unique two-motor architecture further enhances energy efficiency. For example, the controller 110 can set the torque of the first electric motor 210 to zero (0) such that the second electric motor 215 solely propels the vehicle 100. For instance, this can occur at low vehicle speeds where the speed of the first electric motor 210 would be too slow for the first electric motor 210 to operate in a highly efficient region, and other times, depending on the types and designs of the two motors.

Figure 3:
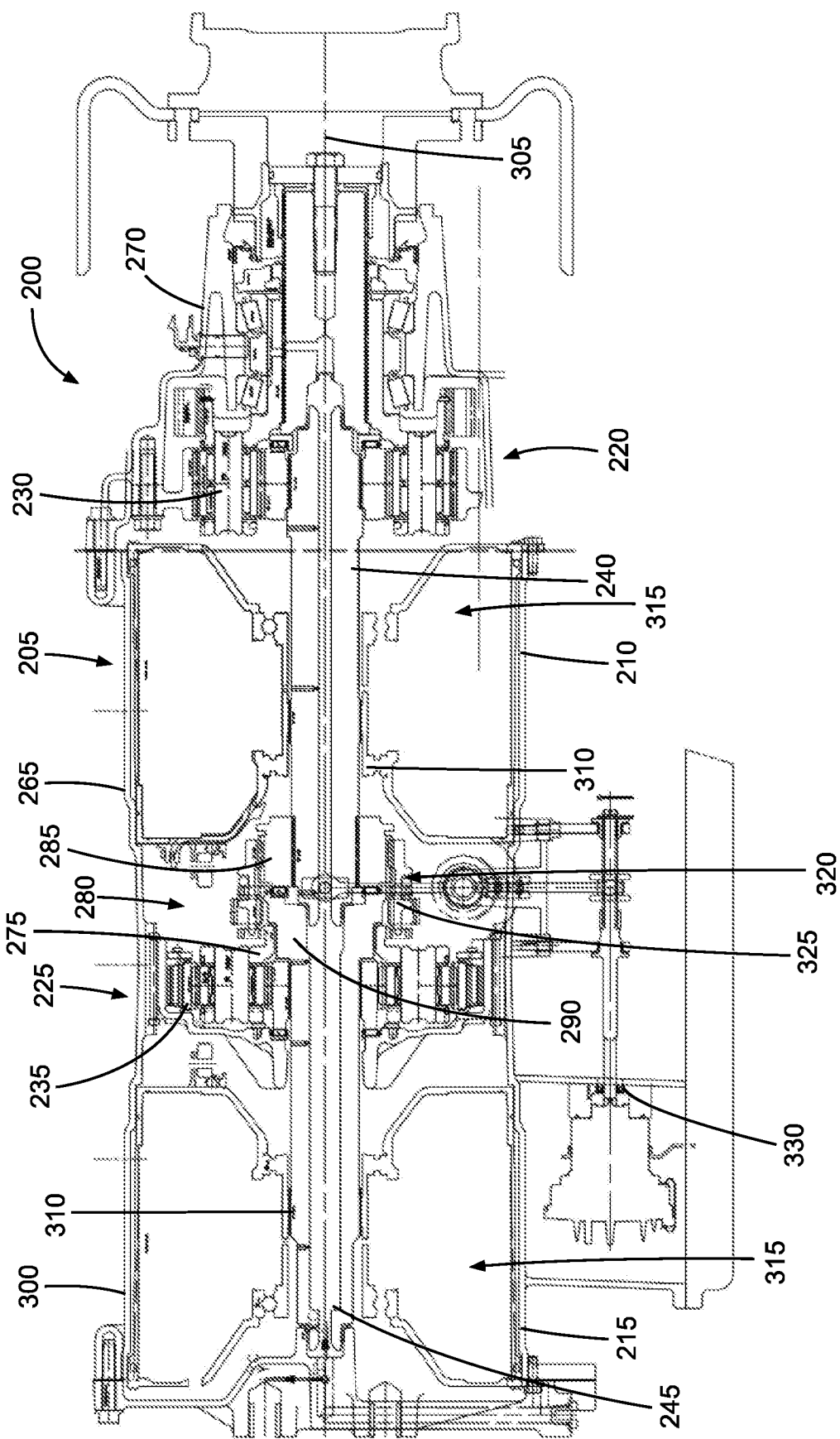
FIG. 3 is a cross-sectional view of one example of the electric powertrain of FIG. 2.

One example of the transmission 205 in the electric powertrain 200 is illustrated in FIG. 3. As can be seen, the electric powertrain 200 in this example includes an electric motor transmission 300 that is constructed in a similar fashion to the transmission 205 shown in FIG. 2. For example, the electric motor transmission 300 includes the first electric motor 210, second electric motor 215, first gear train 220, and second gear train 225 of the type described before. The first gear train 220 is in the form of the first planetary gear 230, and the second gear train 225 is in the form of the second planetary gear 235. The first planetary gear 230 is mounted to the first output shaft 240, and the second planetary gear 235 is mounted to the second output shaft 245. The first output shaft 240 and second output shaft 245 as well as the rest of the components of the electric motor transmission 300 rotate about and are oriented along a longitudinal axis 305 so as to give the electric motor transmission 300 a centerline orientation. The centerline orientation allows for the 1:1 ratio to be more efficient than a layshaft architecture with the motors on parallel which requires a gear mesh to provide power back to the output centerline. There is no such gear mesh loss for the 1:1 ratio in the illustrated centerline orientation. These power loss differentials are further magnified due to losses not only during propulsion but also during regenerative braking.

The components of the electric motor transmission 300 are housed inside the housing 265. As shown in FIG. 3, the first electric motor 210 and the second electric motor 215 each include a rotor 310 and a stator 315. The rotor 310 of the first electric motor 210 is secured to the first output shaft 240, and the rotor 310 of the second electric motor 215 is secured to the second output shaft 245. The stators 315 are in turn secured to the housing 265. The rotors 310 are configured to rotate relative to the fixed stators 315. When rotating, the rotor 310 of the first electric motor 210 rotates the first output shaft 240 which in turn powers the first planetary gear 230. The first planetary gear 230 reduces the output speed of the first electric motor 210 and/or second electric motor 215 that is supplied to the drive shaft 125 via the first carrier 270. Again, this speed reduction by the first gear train 220 can facilitate the use of higher speed consumer vehicle electric motors in heavy commercial-grade vehicles.

The rotor 310 of the stator 315 rotates the second output shaft 245 which in turn powers the second planetary gear 235. Again, the second planetary gear 235 has the second carrier 275 that is configured to transfer mechanical power to the first output shaft 240 via the clutch 280. The clutch 280 in the FIG. 3 is a positive clutch 320 in the form of a dog clutch 325. The dog clutch 325 is actuated or moved by a clutch actuator 330. The clutch actuator 330 is operatively connected to and controlled by the controller 110 over the CAN 120. In one form, the clutch actuator 330 includes an electric motor or solenoid with linkages that actuate the clutch 280 so as to engage or disengage from the first range member 290 or second range member 295. The controller 110 is further operatively connected to the first electric motor 210 and second electric motor 215 to control the speed, torque, and/or relative positions of the first electric motor 210 and second electric motor 215.

With the positive clutch 320 using an interface type connection, the dog clutch 325 dramatically reduces power loss caused by slippage which is commonly present in friction type clutches such as wet and dry disc clutches. Wet and dry clutches further typically require high hydraulic pressures. On the other hand, dog clutches normally just require low lubrication pressures. Thus, the dog clutch 325 lowers the pressure requirements for the hydraulic system in the electric motor transmission 300. The overall design of the electric powertrain 200 facilitates the use of the dog clutch 325. With the first electric motor 210 able to provide continuous power to the drive shaft 125 when needed, the controller 110 can take the time to allow the second electric motor 215 to properly spin up or down to match the speed and relative position of the first range member 290 or second range member 295 with the clutch engagement member 285 of the first electric motor 210 so as to facilitate smooth engagement with minimal power loss.

As can be seen in FIG. 3, the second gear train 225 and clutch 280 are able to be received between the first electric motor 210 and second electric motor 215 so as to provide a compact configuration. Once more, this compact centerline configuration allows the electric motor transmission 300 to be readily retrofitted into preexisting vehicle designs with minimal redesign to major systems such as the suspension, braking, and steering systems. While only two motors are illustrated, the electric powertrain 200 can have more than two motors. For instance, this design is modular such that additional motors, gear trains, and/or clutches can be daisy-chained to the end of the second electric motor 215 so as to provide additional mechanical power.

A technique for operating the powertrain system 105 shown in FIGS. 1, 2, and 3 will be now described with reference to a flowchart 400 shown in FIG. 4. This technique will be described with respect to actuating the dog clutch 325 in FIG. 3, but it should be recognized other types of clutches 280 can be controlled using this technique. Moreover, other types of powertrain systems 105 can be controlled in a similar fashion. With this technique, the controller 110 processes information from and sends control signals to the powertrain system 105 so as to control the operation of the first electric motor 210, second electric motor 215, and clutch 280.

Figure 4:
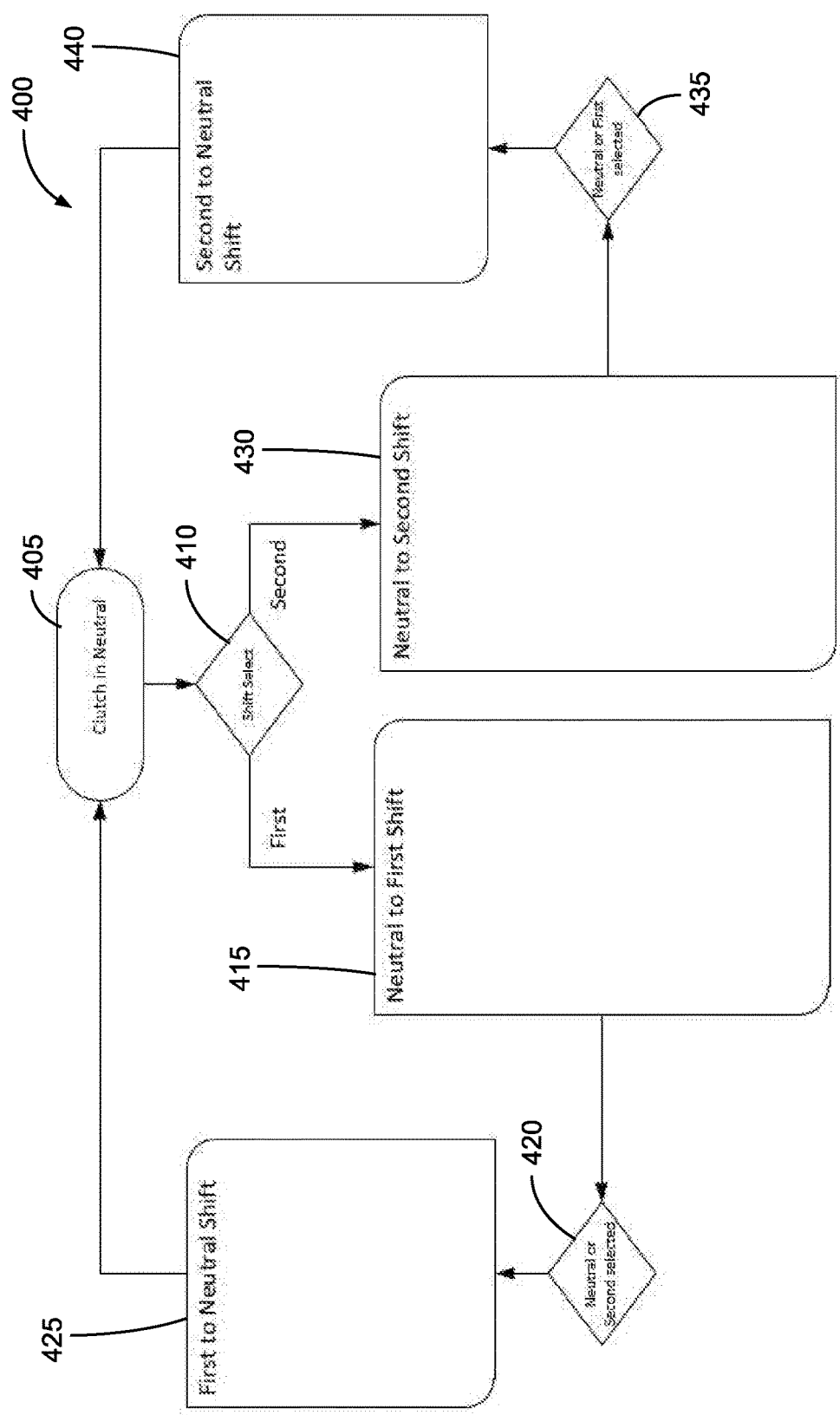
FIG. 4 is a flowchart for illustrating a technique of shifting the electric powertrain.

At stage 405 in the flowchart 400 of FIG. 4, the clutch 280 is positioned in a neutral/shifting position wherein the clutch 280 is not engaged with the first range member 290 and second range member 295. In stage 410, the controller 110 determines whether the clutch 280 needs to be shifted depending on a number of factors like the operational conditions of the vehicle 100 and powertrain system 105. The controller 110 in stage 415 shifts the clutch 280 from the neutral position to the first range or shift position where the clutch 280 engages the first range member 290 to the clutch engagement member 285. At the first range position, both the first electric motor 210 and second electric motor 215 provide power to the drive shaft 125. As compared to the second range or shift position, the second electric motor 215 in the first range position provides greater torque at a lower speed to the clutch engagement member 285 of the first output shaft 240. In stage 420, the controller 110 shifts the clutch 280 back to the neutral position to keep the clutch 280 at the neutral position so that no mechanical power is transferred by the second electric motor 215 or to subsequently shift the clutch 280 to the second range position. The controller 110 in stage 425 shifts the clutch 280 from the first range position to the neutral position of stage 405.

Depending on the operational needs and conditions of the vehicle 100, the controller 110 can shift the electric powertrain 200 to the second range position. When the controller 110 selects the second range position in stage 410, the controller 110 shifts the clutch 280 from the neutral position to the second range position in stage 430. At the second range position, the clutch 280 mechanically connects the second range member 295 to the clutch engagement member 285 of the first output shaft 240. While in the second range position, both the first electric motor 210 and second electric motor 215 provide power to the drive shaft 125. As compared to the first range position, the second electric motor 215 in the second range position provides lower torque at a higher speed to the clutch engagement member 285 of the first output shaft 240. In stage 435, the controller 110 shifts the clutch 280 back to the neutral position to keep the clutch 280 at the neutral position so that no mechanical power is transferred by the second electric motor 215 or to subsequently shift the clutch 280 to the first range position. The controller 110 in stage 440 shifts the clutch 280 from the second range position to the neutral position of stage 405.

Figure 5:
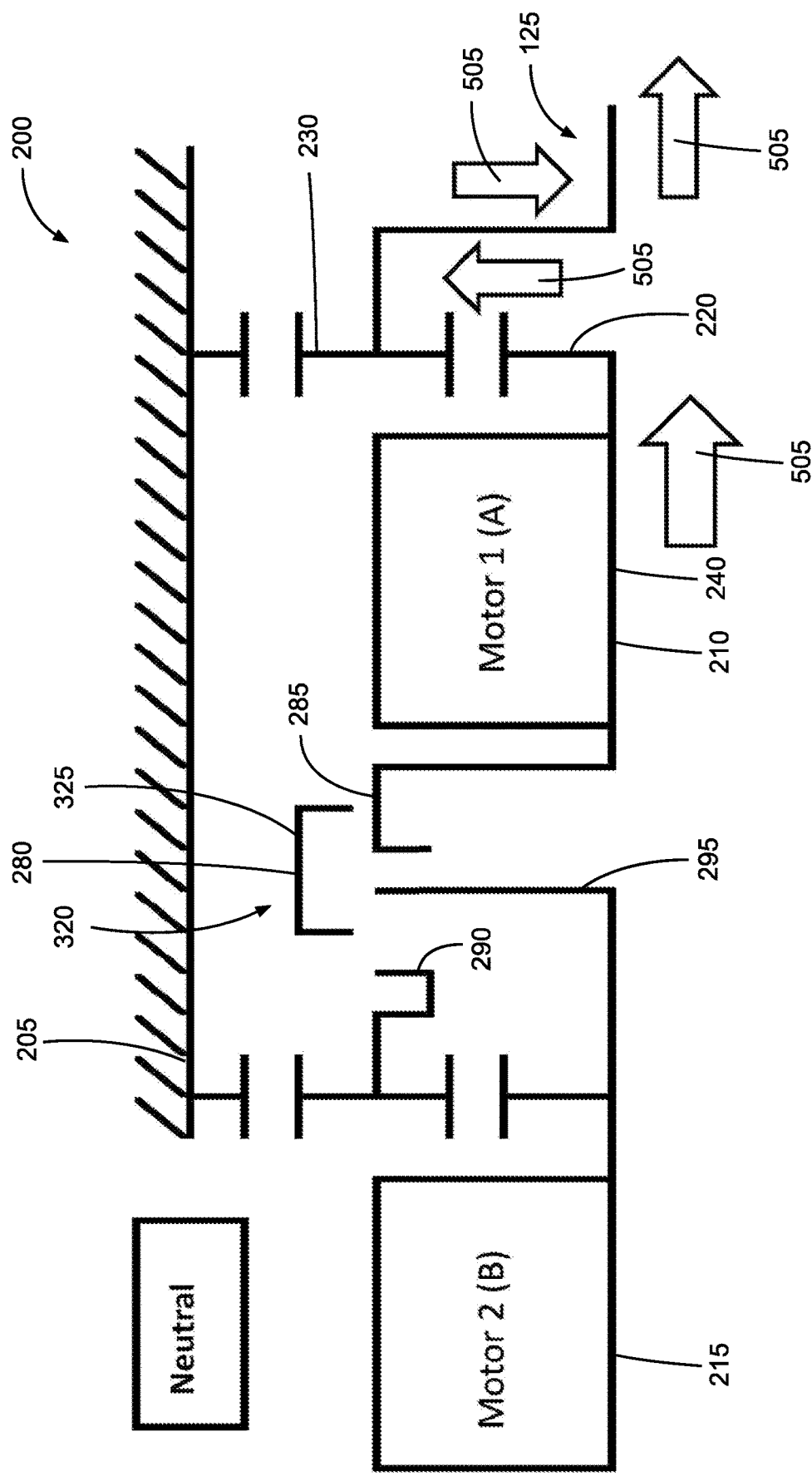
FIG. 5 is a diagrammatic view of the FIG. 2 electric powertrain in a neutral position or shifting configuration.

FIG. 5 illustrates the state of the transmission 205 in the electric powertrain 200 when in the neutral or shifting position of stage 405 of the FIG. 4 flowchart 400. As indicated by arrows 505 in FIG. 5, the sole mechanical power to the drive shaft 125 of the vehicle 100 can only be provided by the first electric motor 210 via the first planetary gear 230. While the arrows 505 are shown as pointing in one direction to the drive shaft 125, mechanical power can be sent the opposite way from the wheels 135 of the propulsion system 130 to the first electric motor 210 for regenerative braking purposes where the first electric motor 210 acts as an electric generator to recharge the ESS 115. The first electric motor 210 when in this neutral position typically provides power to move the wheels 135. For example when coasting downhill, however, the first electric motor 210 can be shut off temporarily to conserve energy or again used as a generator for recharging the ESS 115.

When the clutch 280 is in the neutral position, the second electric motor 215 can likewise be shut off on a temporary (or semi-permanent) basis to conserve energy. As shown in the flowchart 400 of FIG. 4, the controller 110 moves the clutch 280 temporarily into the neutral position when shifting between the first and second range positions. When in this neutral position during shifting, the speed and relative orientation of the output from the second electric motor 215 (i.e., at the first range member 290 or second range member 295) is changed to generally correspond to the current speed and position of the first electric motor 210 when the positive clutch 320, such as the dog clutch 325, is used. Once the speed and position are generally matched, the clutch 280 can be shifted from the neutral position to the desired shift position or range. When the clutch 280 is a friction based clutch, such as a dry or wet disc clutch, the speeds and relative positions of the first electric motor 210 and second electric motor 215 do not need to be as closely matched as compared to the positive clutch 320.

Figure 6:
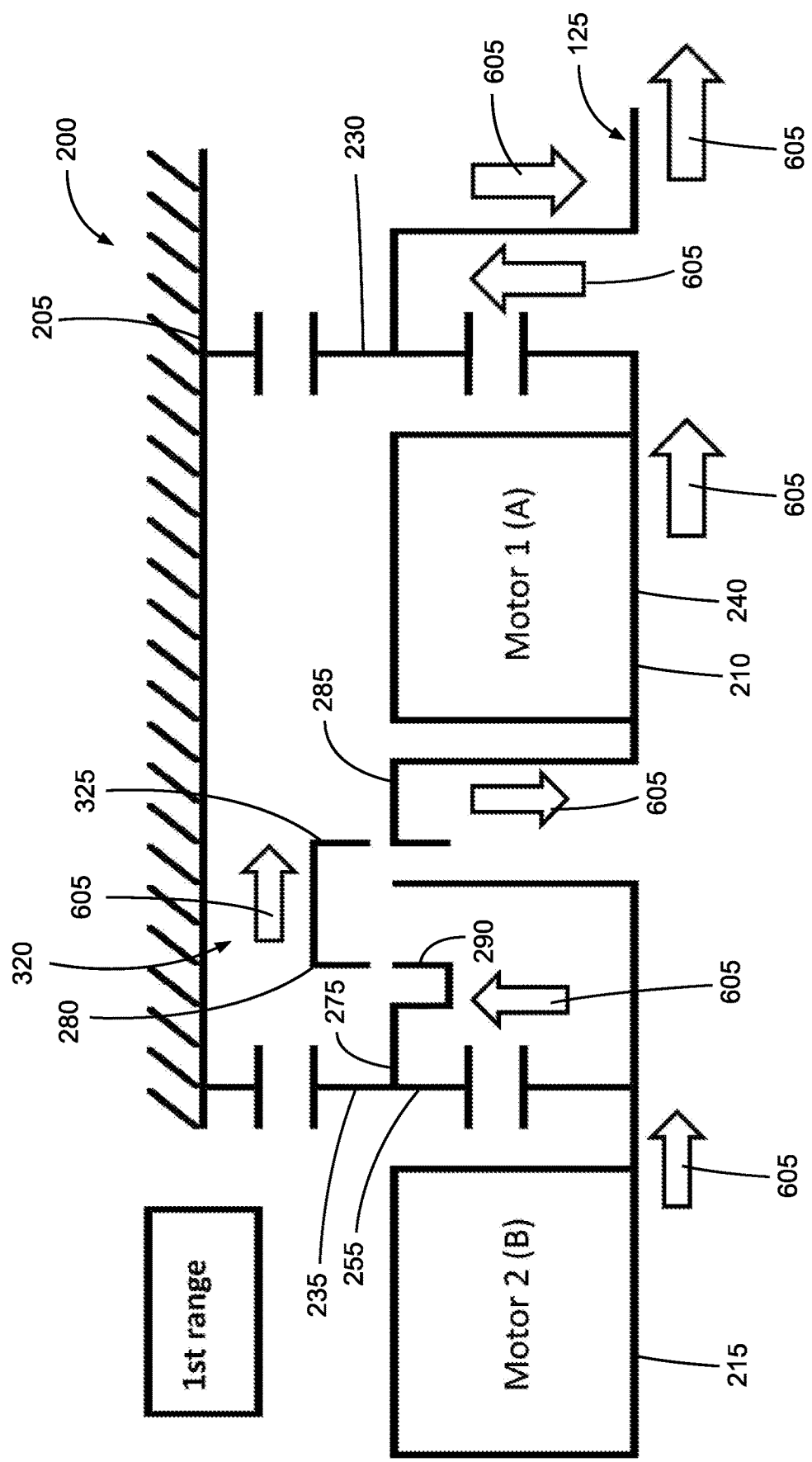
FIG. 6 is a diagrammatic view of the FIG. 2 electric powertrain in a first position or range configuration.

FIG. 6 shows the relative orientation of the clutch 280 when in the first shift or range position of stage 415 (FIG. 4). When the dog clutch 325 is in the first range position, the dog clutch 325 connects the first range member 290 of the second carrier 275 to the clutch engagement member 285 of the first output shaft 240. As indicated by arrows 605 in FIG. 6, both the first electric motor 210 and the second electric motor 215 provide the mechanical power to the drive shaft 125 of the vehicle 100. Once more, the first planetary gear 230 reduces the rotational speed of the resulting output from both the first electric motor 210 and the second electric motor 215. This again allows consumer passenger motors, which tend to have high operational speeds, to be used in heavy duty commercial vehicles. While the arrows 605 are shown as pointing in one direction to the drive shaft 125, mechanical power can be sent the opposite way from the wheels 135 of the propulsion system 130 to the first electric motor 210 and/or second electric motor 215 for regenerative braking purposes where the first electric motor 210 and/or second electric motor 215 act as electric generators to recharge the ESS 115.

The second electric motor 215 is able to supplement, or even replace, the torque provided by the first electric motor 210. When the clutch 280 is in the first range position, the second planetary gear 235 reduces the speed and increases the torque output from the second electric motor 215 via the planet gears 255. The speed of the first electric motor 210 and/or second electric motor 215 can be adjusted so that the dog clutch 325 is able to attain engagement. With the second electric motor 215 providing supplemental (or primary) mechanical power, the first electric motor 210 can be smaller than is required at peak load. This in turn allows electric motors designed for consumer passenger vehicles to be used in larger commercial-grade vehicles. Moreover, the first electric motor 210 and second electric motor 215 can be selected based on the desired power and energy requirements for the vehicle 100. This in turn can increase the range of the vehicle 100 for a single charge of the ESS 115. Normally, both the first electric motor 210 and second electric motor 215 provide power to the drive shaft 125 when in the first range position. However, under certain use cases, one of the motors can be shut off to conserve power. For instance, the second electric motor 215 can be shut off so that the first electric motor 210 provides all of the power to the wheels 135. Alternatively, the first electric motor 210 can be shut off so that the second electric motor 215 provides all of the power to the wheels 135. This may help enhance efficiency under common conditions, such as low speed parking lot maneuvers.

Figure 7:
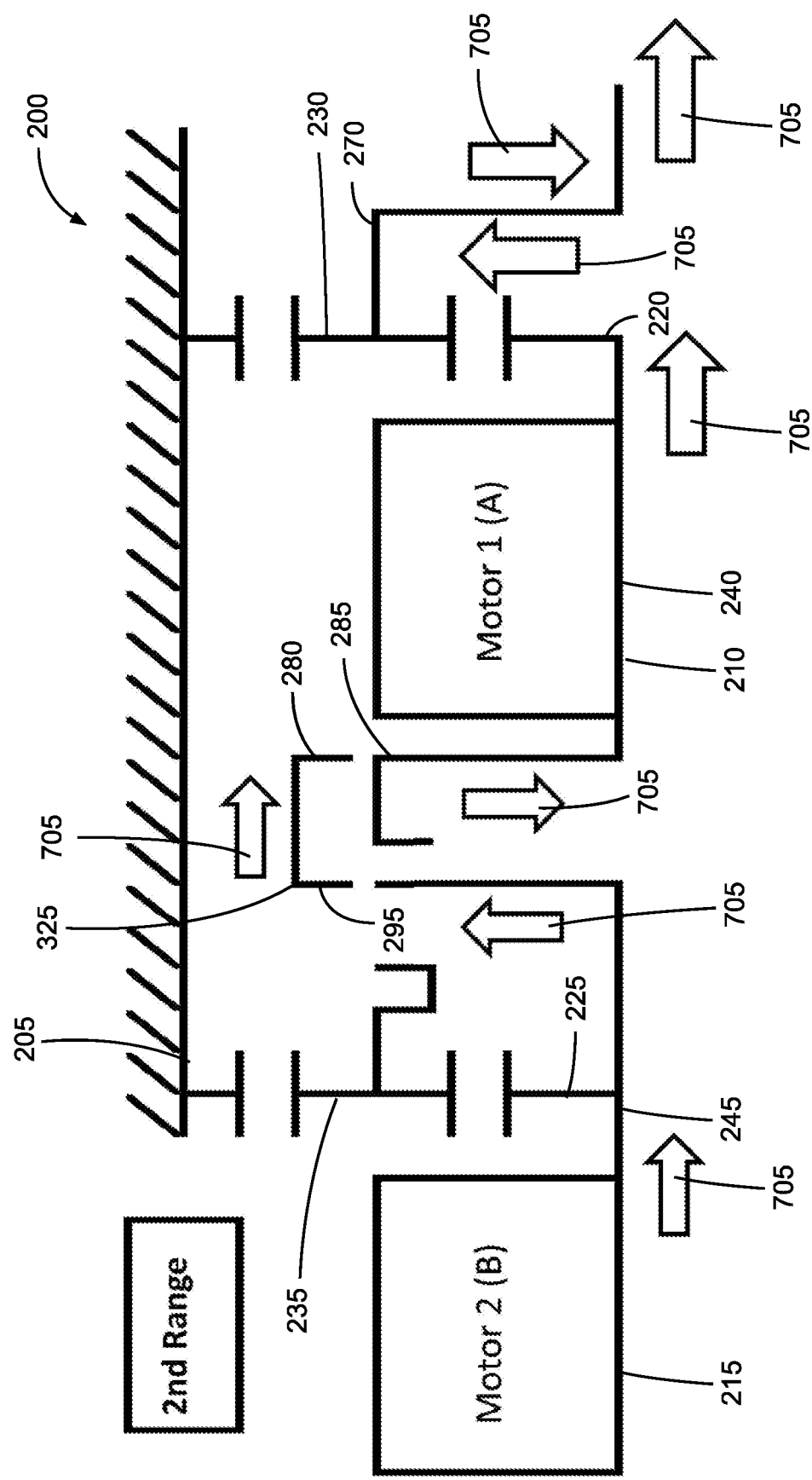
FIG. 7 is a diagrammatic view of the FIG. 2 electric powertrain in a second position or range configuration.

In a similar fashion the second electric motor 215 is able to supplement the torque provided by the first electric motor 210 when in the second shift or range position of stage 430 (FIG. 4). FIG. 7 shows the relative position of the clutch 280 when in the second range position. As can be seen, the dog clutch 325 connects the second range member 295 of the second output shaft 245 to the clutch engagement member 285 of the first output shaft 240. Typically, but not always, the controller 110 selects the second range position when the vehicle 100 is travelling at higher speeds as compared to the first position range. Normally, both the first electric motor 210 and second electric motor 215 provide power to the drive shaft 125 when in the second range position. However, under certain use cases, one of the motors can be shut off to conserve power. For instance, the second electric motor 215 can be shut off so that the first electric motor 210 provides all of the power to the wheels 135. The first electric motor 210 can alternatively be shut off so that the second electric motor 215 provides all of the power to the wheels 135.

As indicated by arrows 705 in FIG. 7, both the first electric motor 210 and the second electric motor 215 provide the mechanical power to the drive shaft 125 of the vehicle 100. In this case, the mechanical output of the second electric motor 215 bypasses the second gear train 225. Once more, the first planetary gear 230 reduces the rotational speed of the resulting output from both the first electric motor 210 and the second electric motor 215. It should be again recognized that this configuration of the electric powertrain 200 allows consumer passenger motors, which tend to have high operational speeds, to be used in heavy duty commercial vehicles. While the arrows 705 in FIG. 7 are shown as pointing in one direction to the drive shaft 125, mechanical power can be sent the opposite way from the wheels 135 of the propulsion system 130 to the first electric motor 210 and/or second electric motor 215 for regenerative braking purposes where the first electric motor 210 and/or second electric motor 215 act as electric generators to recharge the ESS 115.

Figure 8:
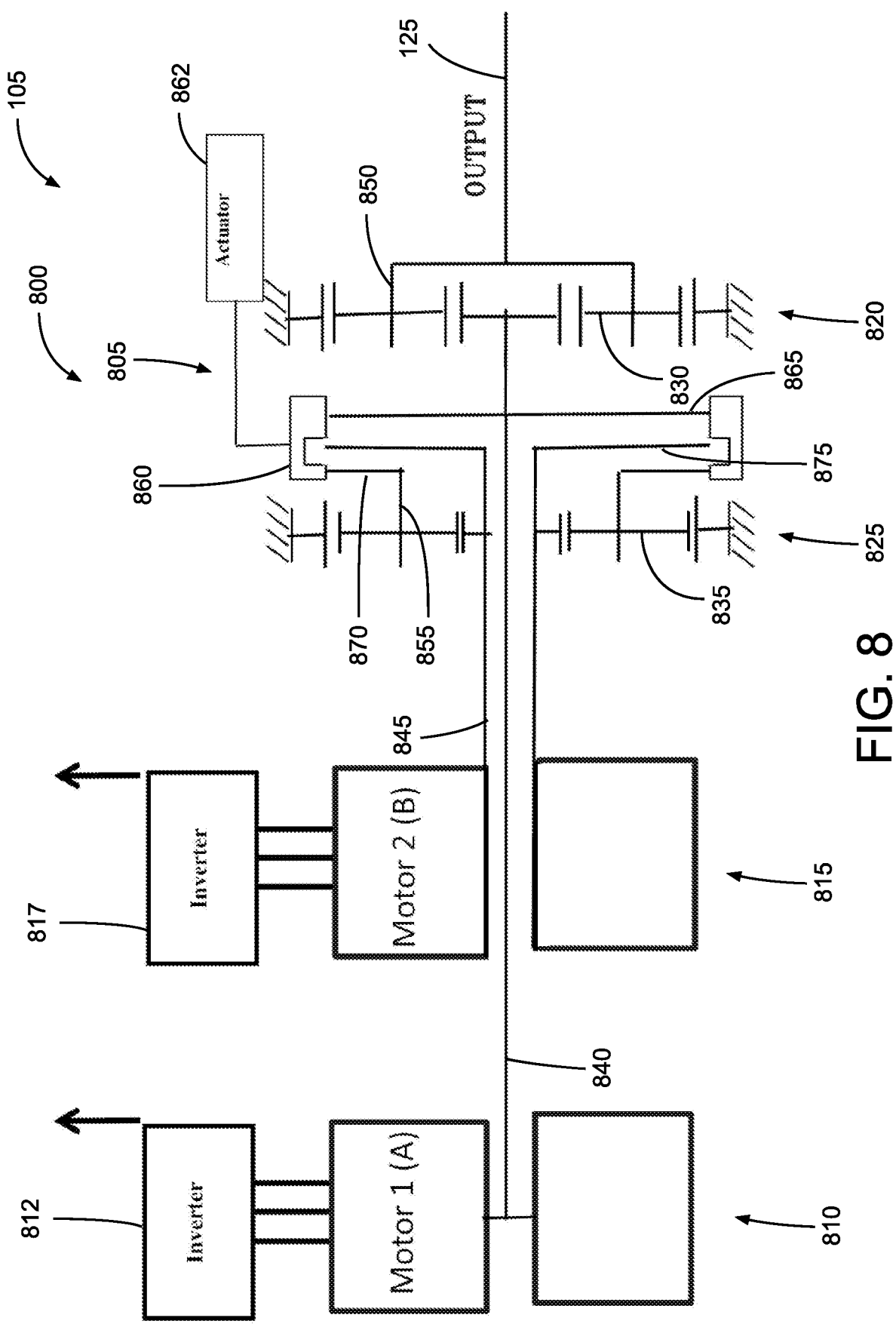
FIG. 8 is a diagrammatic view of another example of an electric powertrain that can be used in the vehicle of FIG. 1.

FIG. 8 shows a diagram of another example of an electric powertrain 800 that can be used in the powertrain system 105 of FIG. 1. The electric powertrain 800 shares a number of components and functions in common with the ones described before (see e.g., FIGS. 2 and 3). For the sake of brevity as well as clarity, these common features will not be described in great detail below, but please refer to the previous discussion.

As depicted, the electric powertrain 800 includes a multiple motor continuous power transmission 805. The transmission 805 of the electric powertrain 800 includes a first electric motor 810 with a first inverter 812 and a second electric motor 815 with a second inverter 817. The first inverter 812 is electrically connected between the ESS 115 and the first electric motor 810, and the second inverter 817 is electrically connected between the ESS 115 and the second electric motor 815. The first inverter 812 and second inverter 817 convert the direct current (DC) from the ESS 115 to alternating current (AC) in order to power the first electric motor 810 and second electric motor 815, respectively. The first electric motor 810 and second electric motor 815 can also act as generators such as during regenerative braking. In such a situation, the first inverter 812 and second inverter 817 convert the AC electrical power from the first electric motor 810 and second electric motor 815, respectively, to DC power that is supplied to the ESS 115. In one example, the first electric motor 810 and second electric motor 815 are the same type of electric motor such that both motors generally provide the same speed and torque output within normal manufacturing tolerances. The first electric motor 810 and second electric motor 815 in one form are both high speed electric motors, and in another form, the first electric motor 810 and second electric motor 815 are both low speed electric motors. In alternative variations, the first electric motor 810 and second electric motor 815 can be different such that one for example is a high speed motor and the other is a low speed motor.

The transmission 805 of the electric powertrain 800 further includes a first gear train 820 and a second gear train 825 both located at an output end of the first electric motor 810 and the second electric motor 815. As can be seen, the first gear train 820 is located at the output end of the entire transmission 805 that is proximal to the drive shaft 125. The second gear train 825 is sandwiched or located between the second electric motor 815 and the first gear train 820. This configuration helps to dampen noise created by the second gear train 825. In the illustrated example, the first gear train 820 is in the form of a first planetary gear 830, and the second gear train 825 is in the form of a second planetary gear 835. The first electric motor 810 and second electric motor 815 respectively have a first output shaft 840 and a second output shaft 845 for providing rotational mechanical power. In the illustrated example, the second output shaft 845 is hollow such that the first output shaft 840 is able to extend through the second output shaft 845 in a concentric manner. Similar to the previous examples, the first planetary gear 830 has a first carrier 850 that is connected to the drive shaft 125, and the second planetary gear 835 has a second carrier 855.

As shown in FIG. 8, the electric powertrain 800 includes at least one clutch 860 with a clutch actuator 862 that engages and disengages the second electric motor 815 from the first electric motor 810. Through the clutch 860, the transmission 805 of the electric powertrain 800 is further able to shift gears such that the speed and/or torque from second electric motor 815 can be changed. The first electric motor 810 is permanently connected to the drive shaft 125 (i.e., there is no clutch) such that the first electric motor 810 is able to provide continuous power to the drive shaft 125 and propulsion system 130. In other words, the first electric motor 810 has an uninterrupted connection to the drive shaft 125, and the second electric motor 815 has an interruptible connection to the drive shaft 125. This configuration of the electric powertrain 800 facilitates power shifting in which power is always able to be provided to the wheels 135 even when shifting of the clutch 860 occurs. With power being continuously provided, any shifting can be made generally imperceptible to the driver and/or passengers.

In the illustrated example, the electric powertrain 800 includes a single clutch 860, but the electric powertrain 800 in other examples can include more than one clutch. In one variation, the clutch 860 is a dog clutch, and in another, the clutch 860 is a Selectable One-Way Clutch (SOWC). In further variations, the clutch 860 includes a wet disc type clutch or a dry disc type clutch. The first output shaft 840 for the first electric motor 810 has a clutch engagement member 865 where the clutch 860 is able to engage the first output shaft 840. The second carrier 855 of the second planetary gear 835 has a first range member 870 where the clutch 860 engages when in a first range position. When in the first range position, the clutch 860 connects the first range member 870 to the clutch engagement member 865 such that the speed (i.e., rpm) provided by the second electric motor 815 is reduced through the second gear train 825, and the torque provided by the second electric motor 815 to the first output shaft 840 is increased through the second planetary gear 835. The second output shaft 845 of the second electric motor 815 has a second range member 875 where the clutch 860 engages when in a second range position. When in the second range position, the clutch 860 connects the second range member 875 to the clutch engagement member 865 such that the speed and torque of the second electric motor 815 is directly provided to the first output shaft 840 of the first electric motor 810. As compared to the first range position, the speed of the second electric motor 815 provided to the first output shaft 840 of the first electric motor 810 is faster, and the torque is less. The clutch 860 can further be positioned at a neutral position where the second electric motor 815 is not mechanically coupled to the first electric motor 810. In the neutral shift position, the first electric motor 810 can provide the sole mechanical power to propel the vehicle 100.

By using more than one electric motor, the powertrain system 105 is configured to allow smaller, consumer automotive electric motors to be used to power larger, commercial-grade vehicles such as those with a FHWA class rating of four (4) or higher and/or those that are able to move 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Again, this multiple motor design also can use energy more efficiently. The power, speed, and/or torque provide by the first electric motor 810 and the second electric motor 815 can be adjusted so that the motors operate in a more efficient manner for differing operational conditions. For example, the clutch 860 can change the gear ratios of the second gear train 825 so as to adjust the output speed and/or torque provided by the second electric motor 815. The clutch 860 can further be used to disconnect the second electric motor 815 from the first electric motor 810 such that the first electric motor 810 provides all of the propulsive mechanical power to the drive shaft 125. At the same time, the second electric motor 815 can be shut down to conserve power and allow the first electric motor 810 operate within an efficient power band, or the speed of the second electric motor 815 can be changed for shifting purposes. Once more, with the first electric motor 810 permanently connected to the drive shaft 125 power can be always applied to the propulsion system 130 such that any shifting of the second gear train 825 via the clutch 860 can be imperceptible to the driver and/or passengers of the vehicle 100. Given the first electric motor 810 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 810, second electric motor 815, second gear train 825, and/or clutch 860.

Figure 9:
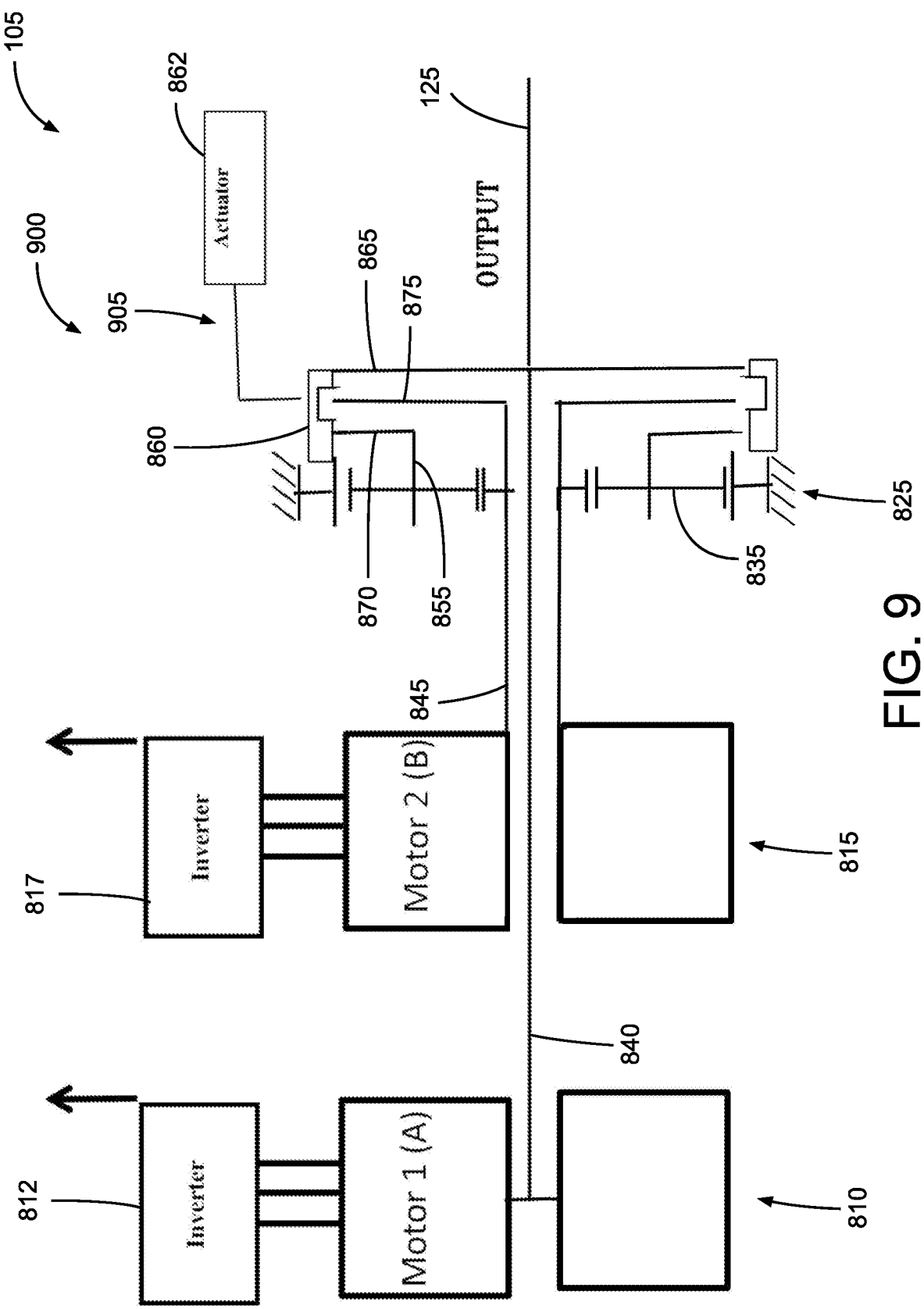
FIG. 9 is a diagrammatic view of a further example of an electric powertrain that can be used in the vehicle of FIG. 1.

FIG. 9 shows an electric powertrain 900 that is a variation of the electric powertrain 800 shown in FIG. 8. As can be seen, the electric powertrain 900 contains the same components and is constructed in the same manner as the electric powertrain 800 shown in FIG. 8. For example, the electric powertrain 900 includes the first electric motor 810, first inverter 812, second electric motor 815, second inverter 817, second gear train 825, second planetary gear 835, first output shaft 840, second output shaft 845, second carrier 855, clutch 860, and clutch actuator 862 of the type described above for the electric powertrain 800 in FIG. 8. However, the electric powertrain 900 has a transmission 905 in which the first gear train 820 (i.e., first planetary gear 830) has been eliminated. This configuration of the electric powertrain 900 is conducive in situations where the first electric motor 810 and second electric motor 815 are both low speed motors such that the first gear train 820 is not required to reduce the speed of the output from the electric powertrain 900.

The electric powertrain 800 in FIG. 8 and electric powertrain 900 in FIG. 9 operate in a similar fashion as the one previously described with respect to FIG. 4. A technique for operating the electric powertrain 800 in FIG. 8 will now be described with reference to FIGS. 4, 10, 11, and 12. It should be recognized that the electric powertrain 900 in FIG. 9 operates in the same manner with the exception that the output power is not routed through the first planetary gear 830 so as to reduce the output speed from the electric powertrain 900. Otherwise, the electric powertrain 900 in FIG. 9 operates in the same fashion as described below.

Figure 10:
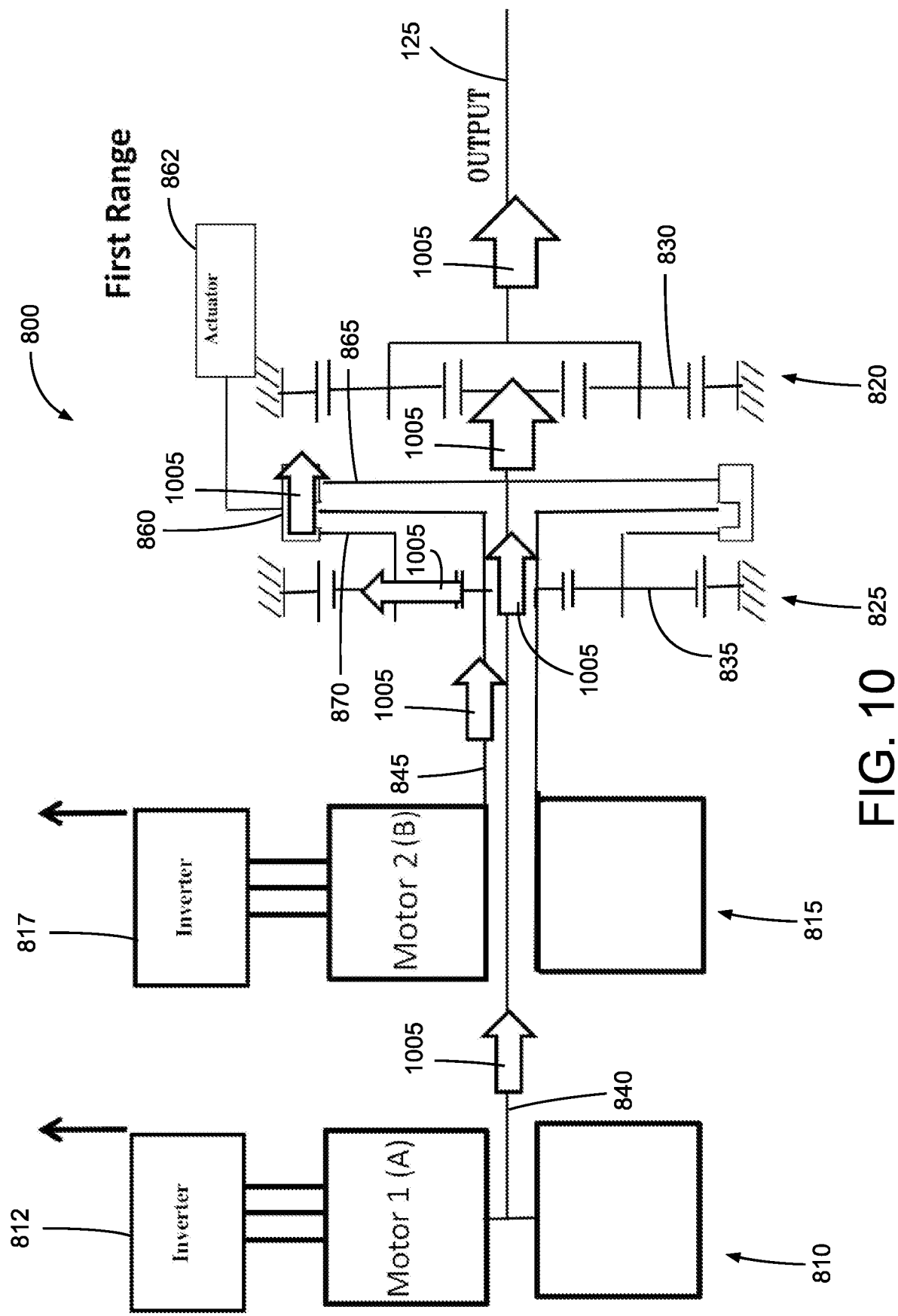
FIG. 10 is a diagrammatic view of the FIG. 8 electric powertrain in a first position or range configuration.

FIG. 10 shows the electric powertrain 800 with the clutch 860 in a first range or shift position (i.e., stage 415 in FIG. 4). The controller 110 via the clutch actuator 862 moves the clutch 860 to the first range where the clutch 860 connects the first range member 870 of the second carrier 855 to the clutch engagement member 865 of the first output shaft 840. As indicated by arrows 1005 in FIG. 10, the torque or power from the first electric motor 810 is transferred to the first planetary gear 830 of the first gear train 820 via the first output shaft 840. The mechanical power from the second electric motor 815 is transferred to the second planetary gear 835 of the second gear train 825 via the second output shaft 845. At the second planetary gear 835, the power is transmitted by the clutch 860 from the first range member 870 of the second planetary gear 835 to the clutch engagement member 865 of the first output shaft 840. As should be recognized, the second planetary gear 835 increases the torque and reduces the speed of the output from the second electric motor 815. The torque of both the first electric motor 810 and second electric motor 815 are combined and transmitted through the first planetary gear 830 to the drive shaft 125. The direction of the arrows 1005 shows the power being transmitted to the drive shaft 125, but in other operational modes, such as during regenerative braking, this direction can be reversed.

Figure 11:
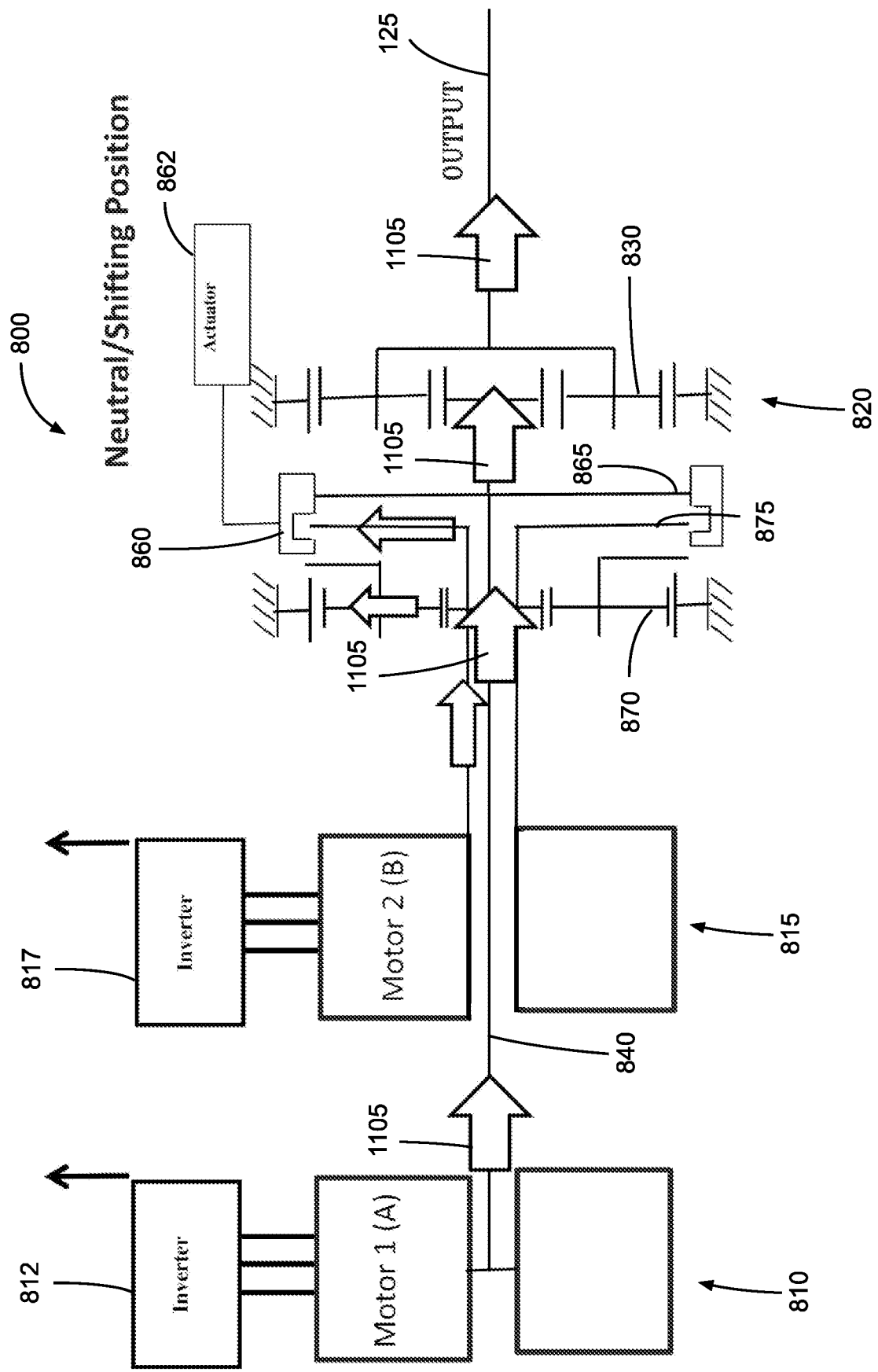
FIG. 11 is a diagrammatic view of the FIG. 8 electric powertrain in a neutral position or shifting configuration.

FIG. 11 shows the electric powertrain 800 with the clutch 860 in the neutral or shifting position of stage 405 in FIG. 4. As can be seen by arrows 1105, the clutch 860 is at a neutral position where the first range member 870 and second range member 875 of the second electric motor 815 are disconnected from the clutch engagement member 865 of the first electric motor 810. When in the position shown in FIG. 77, the controller 110 can place the clutch 860 in the neutral position via the clutch actuator 862 so that the second electric motor 815 can be turned off temporarily to conserve energy and/or otherwise disconnected so as to be unable to supply mechanical power to the first output shaft 840 of the first electric motor 810. The clutch 860 can also be at this position when switching between the first and second range positions so as to provide enough time for the relative velocities and positions of the first electric motor 810 and second electric motor 815 are able to generally match one another. As depicted by the arrows 1105 in FIG. 11, only the first electric motor 810 is able to provide mechanical power to the drive shaft 125 via the first planetary gear 830 and first output shaft 840 when the clutch 860 is in the neutral position. Once more, the direction of the arrows 1105 shows the power being transmitted to the drive shaft 125, but in other operational modes, such as during regenerative braking, this direction can be reversed.

Figure 12:
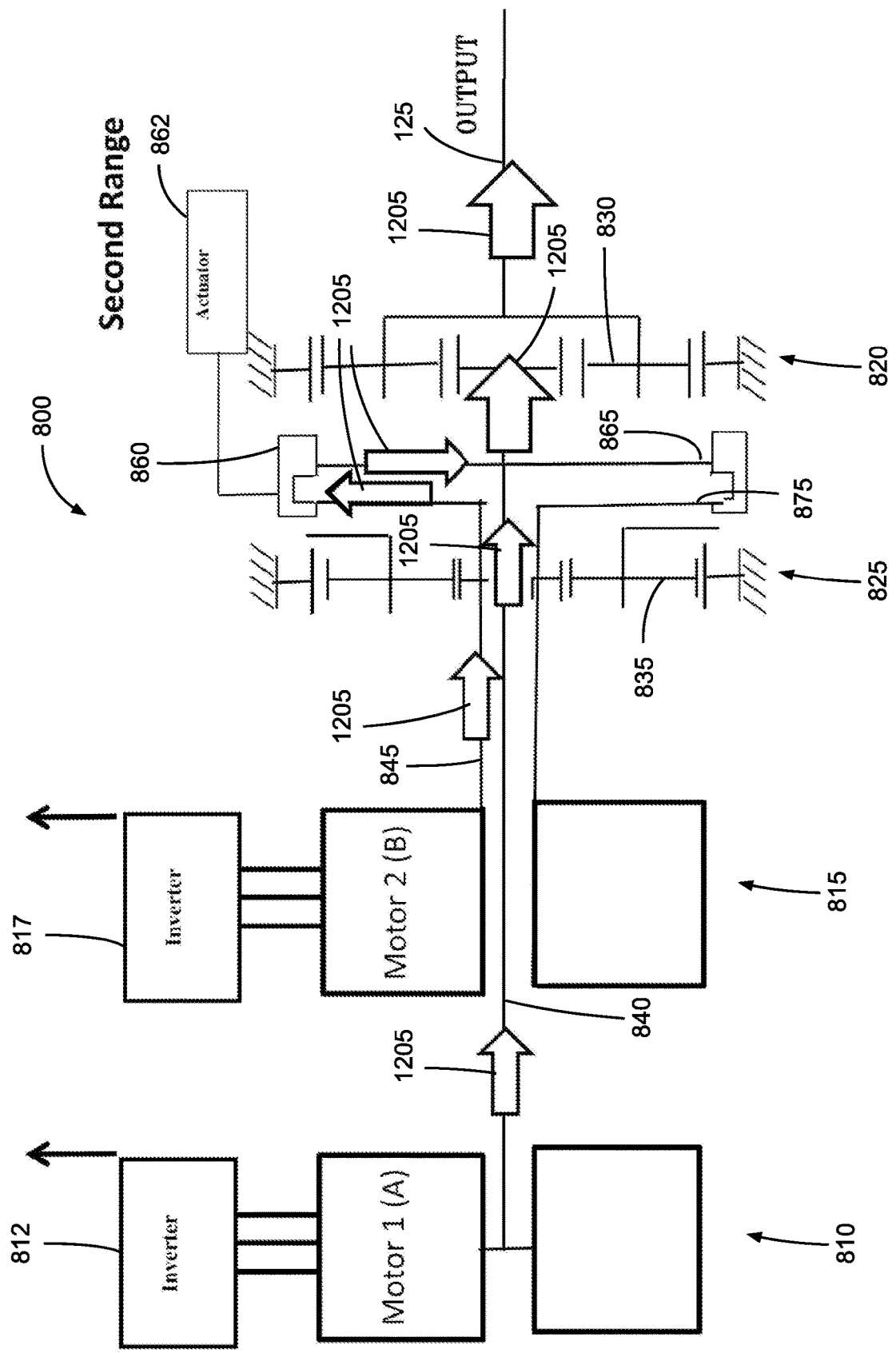
FIG. 12 is a diagrammatic view of the FIG. 8 electric powertrain in a second position or range configuration.

FIG. 12 shows the electric powertrain 800 with the clutch 860 in a second range or shift position of stage 430 in FIG. 4. The controller 110 via the clutch actuator 862 moves the clutch 860 to the first range where the clutch 860 connects the second range member 875 of the second output shaft 845 to the clutch engagement member 865 of the first output shaft 840. As indicated by arrows 1205 in FIG. 12, the torque or power from the first electric motor 810 is transferred to the first planetary gear 830 of the first gear train 820 via the first output shaft 840. The mechanical power from the second electric motor 815 bypasses the second planetary gear 835 of the second gear train 825 and is directly transferred from the second output shaft 845 to the clutch engagement member 865 via the second range member 875. With this arrangement, the speed and torque supplied from the second electric motor 815 to the first output shaft 840 is the same (i.e., not changed). The torque of both the first electric motor 810 and second electric motor 815 are combined and transmitted through the first planetary gear 830 to the drive shaft 125. The direction of the arrows 1205 shows the power being transmitted to the drive shaft 125, but in other operational modes, such as during regenerative braking, this direction can be reversed.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"High Speed Motor" generally refers to a motor that has a maximum output speed of at least 5,000 rpm (rotations per minute) without the use of gear trains or other similar equipment for boosting speed.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Longitudinal" generally relates to length or lengthwise dimension of an object, rather than across.

"Low Speed Motor" generally refers to a motor that has a maximum output speed of less than 5,000 rpm (rotations per minute) without the use of gear trains or other similar equipment for boosting speed.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Positive Clutch" generally refers to a type of clutch that is designed to transmit torque without slippage. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Transmission" generally refers to a power system that provides controlled application of mechanical power. The transmission uses gears and/or gear trains to provide speed, direction, and/or torque conversions from a rotating power source to another device.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vehicle |
| 105 | powertrain system |
| 110 | controller |
| 115 | ESS |
| 120 | CAN |
| 125 | drive shaft |
| 130 | propulsion system |
| 135 | wheels |
| 140 | power cables |
| 200 | electric powertrain |
| 205 | transmission |
| 210 | first electric motor |
| 215 | second electric motor |
| 220 | first gear train |
| 225 | second gear train |
| 230 | first planetary gear |
| 235 | second planetary gear |
| 240 | first output shaft |
| 245 | second output shaft |
| 250 | sun gear |
| 255 | planet gears |
| 260 | ring gear |
| 265 | housing |
| 270 | first carrier |
| 275 | second carrier |
| 280 | clutch |
| 285 | clutch engagement member |
| 290 | first range member |
| 295 | second range member |
| 300 | electric motor transmission |
| 305 | longitudinal axis |
| 310 | rotor |
| 315 | stator |
| 320 | positive clutch |
| 325 | dog clutch |
| 330 | clutch actuator |
| 400 | flowchart |
| 405 | stage |
| 410 | stage |
| 415 | stage |
| 420 | stage |
| 425 | stage |
| 430 | stage |
| 435 | stage |
| 440 | stage |
| 505 | arrows |
| 605 | arrows |
| 705 | arrows |
| 800 | electric powertrain |
| 805 | transmission |
| 810 | first electric motor |
| 812 | first inverter |
| 815 | second electric motor |
| 817 | second inverter |
| 820 | first gear train |
| 825 | second gear train |
| 830 | first planetary gear |
| 835 | second planetary gear |
| 840 | first output shaft |
| 845 | second output shaft |
| 850 | first carrier |
| 855 | second carrier |
| 860 | clutch |
| 862 | clutch actuator |
| 865 | clutch engagement member |
| 870 | first range member |
| 875 | second range member |
| 900 | electric powertrain |
| 905 | transmission |
| 1005 | arrows |
| 1105 | arrows |
| 1205 | arrows |

What is claimed is:

1. A powertrain system, comprising:
an output;
a first electric motor having an uninterrupted connection to an output;
a second electric motor having an interruptible connection to the output;
wherein the interruptible connection includes a clutch and a planetary gear coupled to the second electric motor;
wherein the clutch includes a dog clutch;
wherein the planetary gear includes a sun gear, and one or more planet gears engaged between the sun gear and the ring gear;
first range member connected to the planet gear;
a second range member connected to the sun gear;
wherein the dog clutch has a neutral position, a first range position, and a second range position;
wherein the dog clutch at the neutral position does not engage the first range member and the second range member;
wherein the dog clutch at the first range position engages the first range member to increase torque from the second electric motor; and wherein the dog clutch at the second range position engages the second range member to reduce torque from the second electric motor.

2. The powertrain system of claim 1, wherein the first and second electric motors are low speed motors with a maximum speed of less than 5,000 rpm.

3. The powertrain system of claim 1, wherein the first and second electric motors are high speed motors with a maximum speed of at least 5,000 rpm.

4. The powertrain system of claim 1, wherein the output is configured to move a 40,000 pound or more vehicle.

5. A powertrain system, comprising:
an output;
a first electric motor having an uninterrupted connection to the output;
a second electric motor having an interruptible connection to the output;
wherein the second electric motor is configured to supply power to the output via at least two planetary gears and a clutch;
wherein the clutch includes a dog clutch;
wherein the planetary gears include a first planetary gear and a second planetary gear:
a first output shaft connected to the first electric motor;
a second output shaft connected to the second electric motor;
wherein the first planetary gear is coupled between the first output shaft and the output to increase torque from the first electric motor;
wherein the second planetary gear is connected to the second out lit shaft;
wherein the clutch is configured to selectively engage the second output shaft and the second planetary gear to chat torque from the second electric motor;
wherein the first output shaft and the second output shaft are coupled in an end-to-end engagement; and
wherein the first output shaft and the second output shaft are aligned along a longitudinal axis.

6. The powertrain system of claim 5, wherein the first and second electric motors are high speed motors with a maximum speed of at least 5,000 rpm.

7. The powertrain system of claim 5, wherein the first and second electric motors are low speed motors with a maximum speed of less than 5,000 rpm.

8. The powertrain system of claim 5, wherein the output is configured to move a 40,000 pound or more vehicle.

9. A powertrain system, comprising:
an output;
a first electric motor with an uninterrupted connection to the output;
a second electric motor with an interruptible connection to the output;
wherein the second electric motor is connected to the output via a clutch;
wherein the clutch includes a 3-way dog clutch;
wherein the power is supplied to the output solely through the electric motors;
wherein the first and second electric motors are high speed motors with a rated operating speed of east 5,000 rpm;
wherein the interruptible connection includes a clutch and a planetary gear coupled to the second electric motor;
wherein the planetary gear includes a sun gear, a ring gear, and one or more planet gears engaged between the sun gear and the ring gear;
a first range member connected to the planet gears;
a second range member connected to the sun gear;

wherein the dog clutch has a neutral position, a first range position, and a second range position;
wherein the dog clutch at the neutral position does not engage the first range member and the second range member;
wherein the dog clutch at the first range position engages the first range member to increase torque from the second electric motor; and
wherein the dog clutch at the second range position engages the second range member to reduce torque from the second electric motor.

10. The powertrain system of claim 9, wherein the uninterrupted connection of the first electric motor includes a first gear train configured to reduce speed.

11. The powertrain system of claim 10, wherein the interruptible connection of the second electric motor includes a second gear train.

12. The powertrain system of claim 10, wherein the first gear train includes a planetary gear.

13. The powertrain system of claim 1, wherein the uninterrupted connection of the first electric motor includes a first gear train configured to reduce speed.

14. The powertrain system of claim 13, wherein:
the first gear train includes a first planetary gear; and
the first planetary gear is coupled between the first electric motor and the output.

15. The powertrain system of claim 14, wherein the first electric motor has a first output shaft and the second electric motor has a second output shaft axially aligned along a longitudinal axis.

16. The powertrain system of claim 15, wherein the first planetary gear is coupled between the first electric motor and the output.

17. The powertrain system of claim 1, wherein the power is supplied to the output solely through the electric motors.

18. The powertrain system of claim 1, wherein the first electric motor has a first output shaft and the second electric motor has a second output shaft axially aligned along a longitudinal axis.

19. The powertrain system of claim 18, wherein the first output shaft and the second output shaft are coupled in an end-to-end engagement.

20. The powertrain system of claim 1, wherein the first electric motor, the second electric motor, the planetary gear, and the output are aligned along a longitudinal axis.

21. The powertrain system of claim 5, wherein the power is supplied to the output solely through the electric motors.

22. The powertrain system of claim 5, further comprising:
wherein the second planetary gear includes a sun gear, a ring gear, and one or more planet gears engaged between the sun gear and the ring gear;
a first range member connected to the planet gears; and
a second range member connected to the sun gear.

23. The powertrain system of claim 22, wherein:
the dog clutch has a neutral position, a first range position, and a second range position;
the dog clutch at the neutral position does not engage the first range member and the second range member;
the dog clutch at the first range position engages the first range member to increase torque from the second electric motor; and
the dog clutch at the second range position engages the second range member to reduce torque from the second electric motor.

24. The powertrain system of claim 12, wherein the first electric motor has a first output shaft and the second electric motor has a second output shaft axially aligned along a longitudinal axis.

25. The powertrain system of claim 24, wherein the first planetary gear is coupled between the first electric motor and the output.

* * * * *

UNITED STATES PATENT AND TRADEMARK OFFICE
CERTIFICATE OF CORRECTION

PATENT NO. : 11,040,607 B2
APPLICATION NO. : 16/510004
DATED : June 22, 2021
INVENTOR(S) : Arthur L. McGrew et al.

It is certified that error appears in the above-identified patent and that said Letters Patent is hereby corrected as shown below:

In the Claims

Column 20, Claim 1, Line 55, replace "wherein the planetary gear includes a sun gear, and one or" with --wherein the planetary gear includes a sun gear, a ring gear, and one or--

Column 20, Claim 1, Line 58, replace "first range member connected to the planet gear;" with --a first range member connected to the planet gears;--

Column 21, Claim 5, Line 23, replace "wherein the planetary gears include a first planetary gear and a second planetary gear:" with --wherein the planetary gears include a first planetary gear and a second planetary gear;--

Column 21, Claim 5, Line 31, replace "second out lit shaft;" with --second output shaft;--

Column 21, Claim 5, Line 34, replace "chat torque from the second electric motor;" with --change torque from the second electric motor;--

Column 21, Claim 9, Line 59, replace "speed motors with a rated operating speed of at east 5,000 rpm;" with --speed motors with a rated operating speed of at least 5,000 rpm;--

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*